United States Patent
Toplin

(10) Patent No.: US 7,594,482 B1
(45) Date of Patent: Sep. 29, 2009

(54) ILLUMINATED MODULAR DOG LEASH AND COLLAR ASSEMBLY

(76) Inventor: Kevin Toplin, 7021 Heath Dr., Port Richey, FL (US) 34668

( * ) Notice: Subject to any disclaimer, the term of this patent is extended or adjusted under 35 U.S.C. 154(b) by 522 days.

(21) Appl. No.: 11/640,145

(22) Filed: Dec. 18, 2006

Related U.S. Application Data

(60) Provisional application No. 60/745,468, filed on Apr. 24, 2006.

(51) Int. Cl.
*A01K 27/00* (2006.01)
(52) U.S. Cl. ........................ 119/792; 119/859
(58) Field of Classification Search ................ 119/792, 119/793, 795, 796, 770, 797, 799, 859; 362/108, 362/103, 109, 84, 234
See application file for complete search history.

(56) References Cited

U.S. PATENT DOCUMENTS

| | | | | |
|---|---|---|---|---|
| 2,275,701 | A * | 3/1942 | Taylor | 119/798 |
| 3,935,443 | A * | 1/1976 | Simmons | 362/108 |
| 3,944,803 | A * | 3/1976 | Chao | 362/108 |
| 4,173,201 | A * | 11/1979 | Chao et al. | 119/859 |
| 4,779,172 | A * | 10/1988 | Jimenez et al. | 362/104 |
| 4,887,552 | A * | 12/1989 | Hayden | 119/793 |
| 5,046,456 | A * | 9/1991 | Heyman et al. | 119/859 |
| 5,630,382 | A | 5/1997 | Barbera | |
| 5,850,807 | A * | 12/1998 | Keeler | 119/799 |
| 5,967,095 | A | 10/1999 | Greves | |
| D422,385 | S * | 4/2000 | Callaghan | D30/153 |
| 6,557,498 | B1 * | 5/2003 | Smierciak et al. | 119/858 |
| 6,805,460 | B1 | 10/2004 | Zoller | |
| 7,131,743 | B2 * | 11/2006 | Leason et al. | 362/104 |
| 7,367,285 | B2 * | 5/2008 | Cooper | 119/795 |
| 2003/0026090 | A1 * | 2/2003 | Bornovski | 362/104 |

* cited by examiner

*Primary Examiner*—Yvonne R. Abbott

(57) ABSTRACT

An illuminated modular dog leash and collar assembly includes electrically mated segments connected end-to-end and defining a rectilinear shape. Each of the segments includes illuminable light-emitting sources housed therein and connected in sequence, a tubular core, and a sleeve removably positioned about the core. The sleeve extends along the entire longitudinal length of the modular segment associated therewith. An extendable handle is removably attached to the leash and spaced from the collar, and is adaptable between alternate longitudinal lengths. A mechanism independently illuminates the light-emitting sources such that the collar and leash selectively illuminate when the pet becomes separated from the caregiver beyond a predetermined distance.

18 Claims, 13 Drawing Sheets

ILLUMINATED MODULAR DOG LEASH AND COLLAR ASSEMBLY

CROSS REFERENCE TO RELATED APPLICATIONS

This application claims the benefit of U.S. Provisional Application No. 60/745,468, filed Apr. 24, 2006, the entire disclosure of which is incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to leash and collar assemblies and, more particularly, to an illuminated modular dog leash and collar assembly for allowing a caregiver and bystanders to easily identify an animal during low ambient light conditions.

2. Prior Art

Pet owners, particularly dog owners, take their animals for walks as recreation on generally a daily basis. Very often, such walks are taken beyond or before daylight hours. Today's busy and bustling society makes demands upon many persons who choose to keep pets such as dogs and the like such that they do not have the opportunity on a daily basis to walk their animal during daylight hours. At night, visibility becomes an issue due to significant, if not heavy, automobile and other vehicle traffic in even rural areas. If a person or animal cannot be seen by a driver of such a vehicle, the risk of accident is particularly serious when crossing the street or otherwise. To remedy this vulnerability, lights and/or reflectors have been attached to collars, leashes, clothing, etc. in order to give the person or animal greater visibility to oncoming traffic. Such lights and/or reflectors are generally used to provide visibility of the wearer for oncoming traffic.

One prior art example shows a dog collar flashlight for providing illuminating light sufficient to perceive and visually detect items on the ground and adjacent the animal to which the dog collar flashlight is attached. A dog collar flashlight has an illuminating light that goes far beyond the providing of mere visibility but allows the visual detection of objects illuminated by the light such as cracks in the sidewalk, obstacles in the path of the dog wearing the dog collar flashlight, and the activation of reflective material by the illuminating light. The light is controlled by a selectable switch and is housed along with the switch in a casing that allows a collar to engage in the dog collar flashlight. Collar-engaging loop portions attached to the dog collar flashlight case allows a collar to engage the dog collar flashlight and fix the dog collar flashlight to the dog or other animal. Unfortunately, this prior art example poses a safety hazard to drivers if the light is shined into a driver's eyes while operating a motor vehicle.

Another prior art example shows an illuminated pet harness that comprises the use of a neck and body collar strap structure arranged for securement about an animal's neck and torso region respectively, having a connecting web extending between the neck and collar straps. If desired, alternatively only a neck collar strap may be employed by the invention as opposed to a full body harness as indicated. The straps include top and bottom layers secured at their side portions to define a cavity therethrough, having a fiber optic core, with the fiber optic core directed to at least one battery housing, such that at least one illumination bulb within the battery housing directs illumination onto the fiber optic core that in turn projects illumination through a plurality of lenses directed through a top layer web of each of the straps. Unfortunately, the use of fiber optics makes this design susceptible to damage, as well as prohibitively expensive for most pet owners.

Accordingly, a need remains for an illuminated modular dog leash and collar assembly in order to overcome the above-noted shortcomings. The present invention satisfies such a need by providing an assembly that is convenient and easy to use, is lightweight yet durable in design, and allows a caregiver and bystanders to easily identify an animal during low ambient light conditions. Such an assembly effectively increases the safety of owners and pets when walking in darkened conditions. The assembly advantageously provides a highly visible means for passing motorists to discern the presence of an animal, thus providing a driver with ample warning to slow a vehicle and avoid an accident or injury to a pet or owner. The present invention is simple to use, inexpensive, and designed for many years of repeated use.

BRIEF SUMMARY OF THE INVENTION

In view of the foregoing background, it is therefore an object of the present invention to provide an assembly for an illuminated modular dog leash and collar assembly. These and other objects, features, and advantages of the invention are provided by an illuminable animal leash and collar assembly for allowing a caregiver and bystanders to easily identify an animal during low ambient light conditions.

The assembly includes a leash including a plurality of electrically mated modular segments conveniently connected end-to-end and thereby effectively defining a rectilinear longitudinal shape, wherein such modular segments are interchangeably coupled along a longitudinal length of the leash. Each of the modular segments includes a plurality of illuminable light-emitting sources housed therein and advantageously connected in sequence respectively such that selected ones of the modular segment light-emitting sources effectively illuminate in sync with respect to other ones of the modular segment light-emitting sources.

Each of the modular segments includes a tubular core conveniently embedded with corresponding ones of the light-emitting sources, and a transparent hollow sleeve removably positioned about the tubular core. Such a sleeve has a unitary and continuous body effectively extending along the entire longitudinal length of the modular segment associated therewith. A collar includes a plurality of electrically mated modular regions. Each of such modular regions includes a plurality of illuminable light-emitting sources housed therein and advantageously connected in sequence respectively such that selected ones of the modular region light-emitting sources effectively illuminate in sync with respect to other ones of the modular region light-emitting sources. Each of the modular segments and the modular regions includes detachably mated conductive male and female couplings advantageously disposed at opposed ends thereof respectively.

The assembly further includes, in an alternate embodiment, a collar that includes first and second modular regions that have annular shapes provided with electrically mated conductive terminals. A third one of the modular regions has a rectilinear shape conveniently provided with axially opposed conductive terminals removably coupled directly to the first and second modular regions. The leash further includes a fastener connected directly to one end portion thereof. Such a fastener is in electrical communication with an internal power source and is advantageously provided with a conductive terminal removably engaged with the conductive terminals of the first, second and third regions to thereby effectively maintain direct electrical communication with the first, second and third modular regions when the leash is attached to the collar.

The assembly further includes an extendable handle removably attached to the leash and spaced from the collar. Such an extendable handle is selectively adaptable between alternate longitudinal lengths when pulled along a predetermined path away from the leash. The light-emitting sources housed within the leash remain non-illuminated while the light-emitting sources housed within the collar are illuminated when the handle is adapted to a first spatial distance away from the leash. Such a first spatial distance is effectively defined as a longitudinal length less than one-half of the longitudinal length of the leash. The light-emitting sources housed within the leash remain illuminated while the light-emitting sources housed within the collar are illuminated when the handle is adapted to a second spatial distance. Such a second spatial distance is defined as a longitudinal length greater than one-half of the longitudinal length of the leash.

The assembly further includes a mechanism for independently illuminating the selected modular segment and region light-emitting sources respectively such that the modular segment and region light-emitting sources remain effectively non-illuminated based upon the longitudinal length of the handle with respect to a longitudinal length of the leash. Such an independent illuminating mechanism includes a spring-actuated spindle and a flexible cable journaled thereabout. Such a cable has opposed ends directly anchored to the handle and the spindle respectively and conveniently includes a plurality of actuating fingers protruding outwardly therefrom. Each of the fingers is uniquely sized and effectively maintains a unique spatial distance from the associated switch (herein described below) such that associated ones of the fingers advantageously engage associated ones of the switches while traveling along a single travel path and thereby effectively prohibit non-corresponding ones of the fingers and switches from engaging as the cable is extracted and retracted from the compartment (herein described below).

The independent illuminating mechanism further includes a plurality of switches conveniently housed within a compartment defined within the leash, and electrically coupled to an internal power supply source respectively. Such switches are contiguously laid along a travel path of the cable in such a manner that the fingers sequentially toggle associated ones of the switches while the cable is effectively passed through the compartment to thereby toggle the switches between open and closed positions respectively. Each of the switches is electrically coupled to corresponding ones of the modular segments and regions respectively such that the light-emitting sources associated with the corresponding modular segments and regions are independently illuminated when the fingers toggle the associated ones of the switches respectively.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
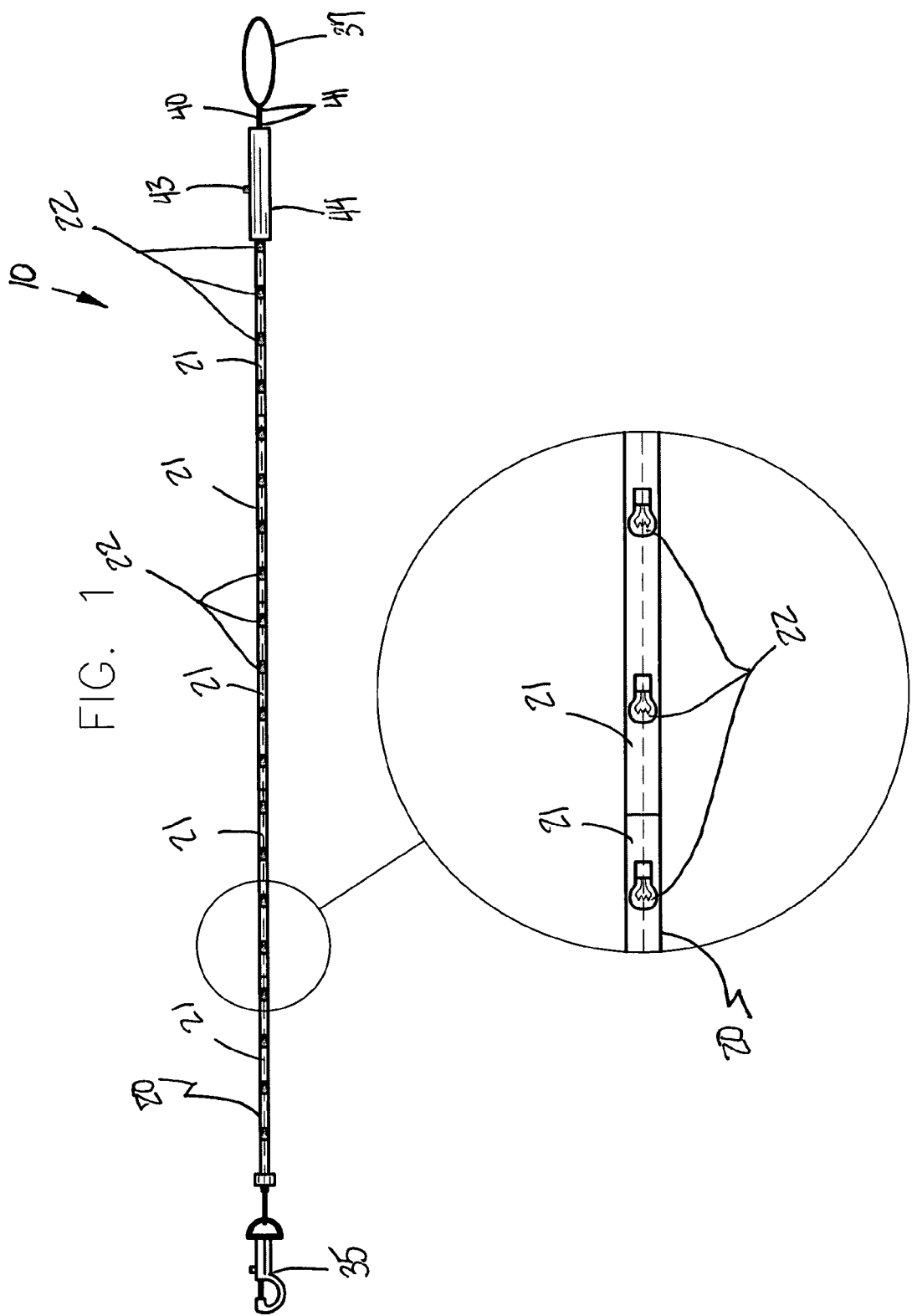
FIG. 1 is a side elevational and partial expanded view of an illuminated modular dog leash and collar assembly, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The assembly of this invention is referred to generally in FIGS. 1-13 by the reference numeral 10 and 10' is intended to provide an illuminated modular dog leash and collar assembly. It should be understood that the assembly 10 and 10' may be used to illuminate many different types of animals in many different types of low ambient light conditions and should not be limited in use to only those types of animals and conditions described herein.

Referring initially to FIGS. 1, 2, 3, 4, 5 and 6, the assembly 10 includes a leash 20 including a plurality of electrically mated modular segments 21 connected end-to-end and thereby defining a rectilinear longitudinal shape, wherein such modular segments 21 are interchangeably coupled along a longitudinal length of the leash 20. This interchangeability allows a user to selectively lengthen or shorten the leash 20 depending on user desire. Each of the modular segments 21 includes a plurality of illuminable light-emitting sources 22 housed therein and advantageously connected in sequence respectively, which is essential such that selected ones of the modular segment light-emitting sources 22 illuminate in sync with respect to other ones of the modular segment light-emitting sources 22. Such light emitting sources 22 thereby provide illumination along an entire length of the assembly 10, which is necessary for providing maximum visibility of a pet and a user during low light conditions, and thus increasing the safety of the same.

Again referring to FIG. 3, each of the modular segments 21 includes a tubular core 23 embedded with corresponding ones of the light-emitting sources 22, and a transparent hollow sleeve 24 removably positioned about the tubular core 23. Such a sleeve 24 has a unitary and continuous body extending along the entire longitudinal length of the modular segment 21 associated therewith.

Figure 7:
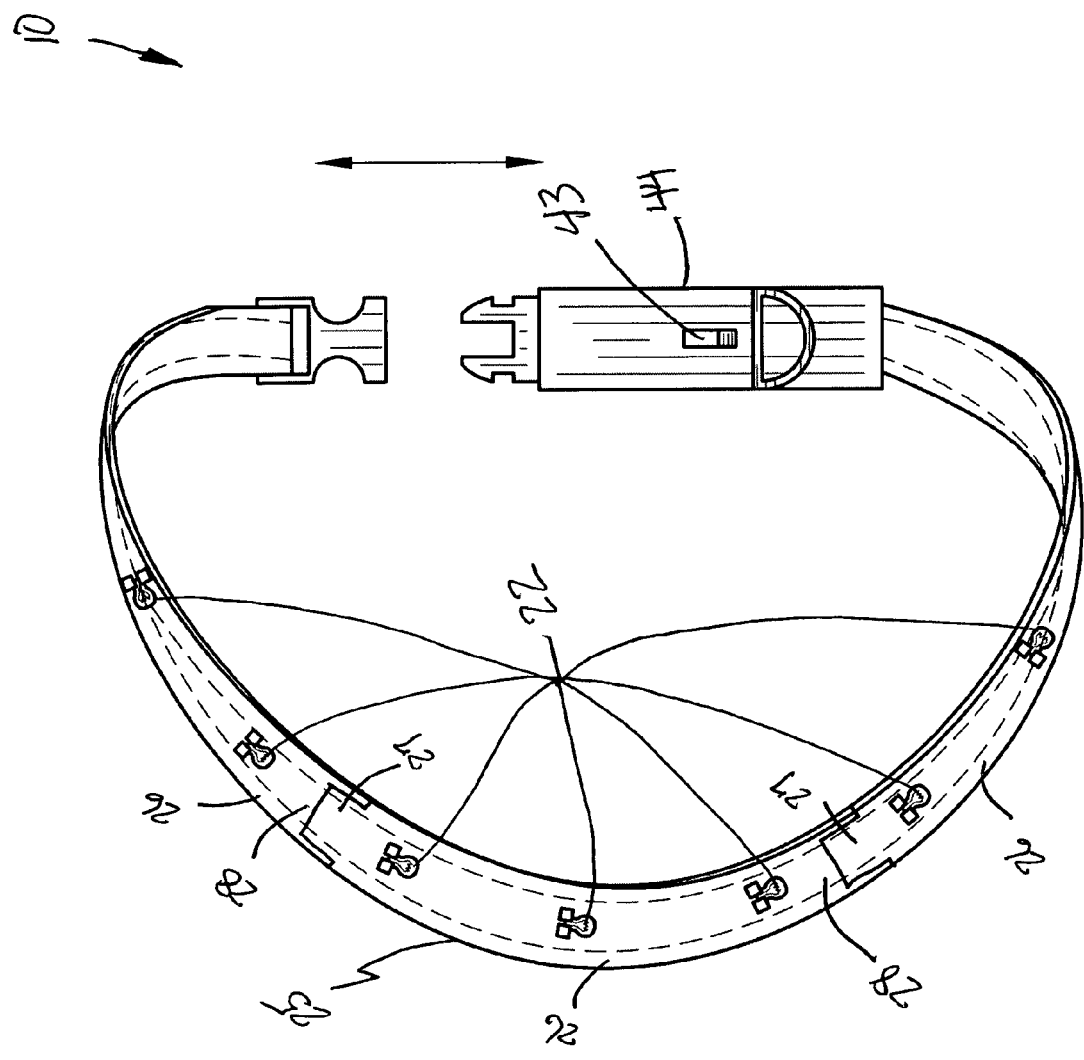
FIG. 7 is a perspective view of the collar.
Figure 10:
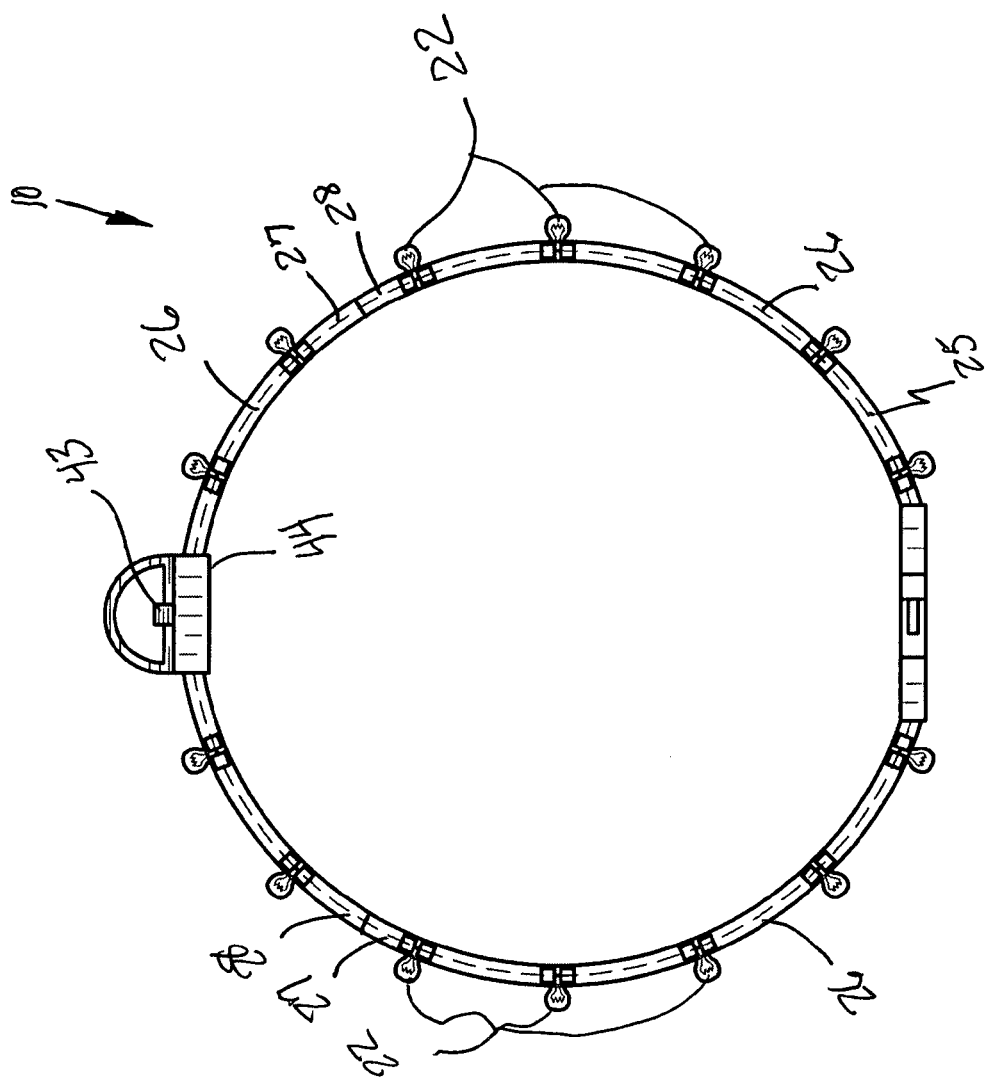
FIG. 10 is a side elevational view of the collar shown in FIG. 7 shown in a connected position.
Figure 11:
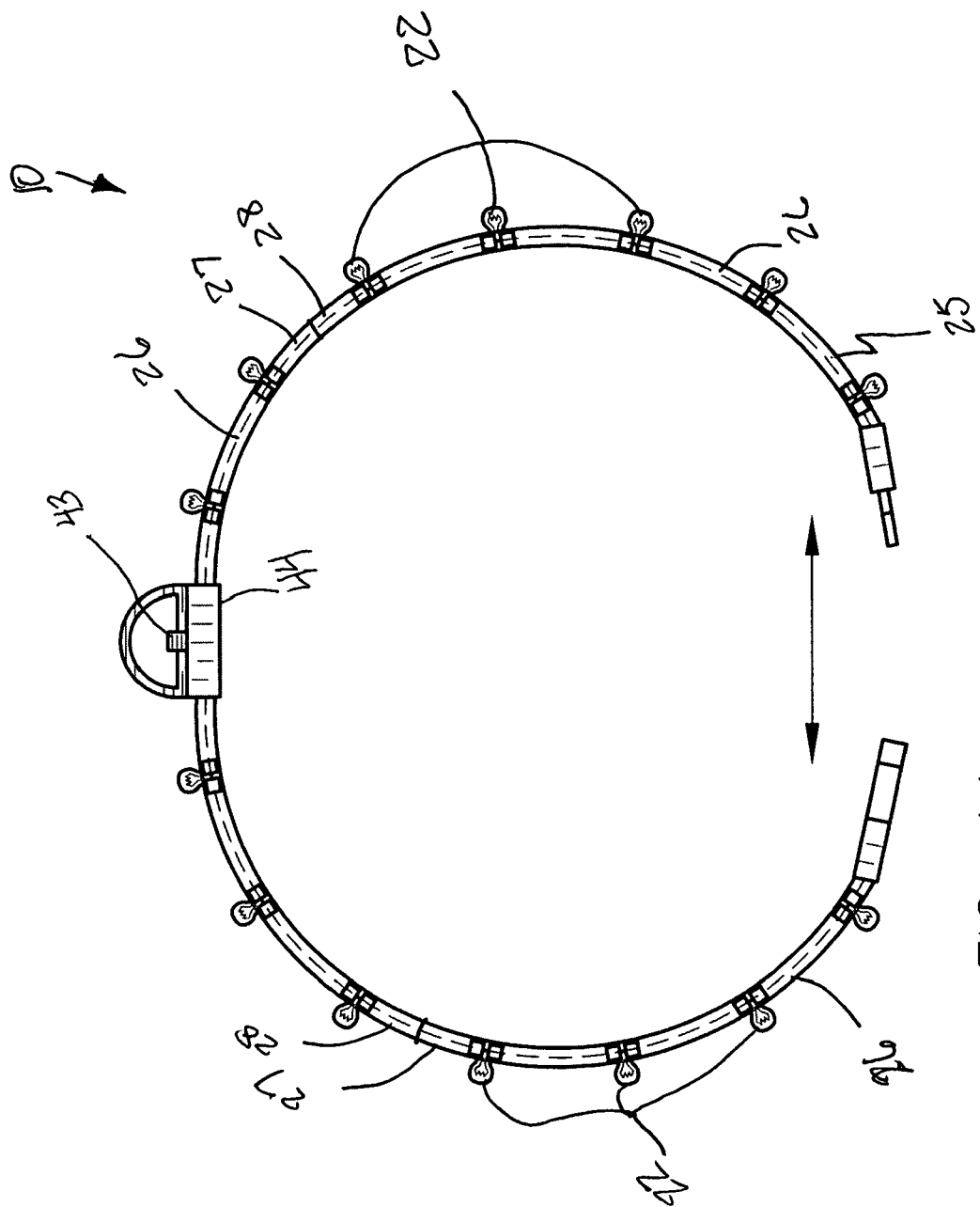
FIG. 11 is a side elevational view of the collar shown in FIG. 10 shown in a disconnected position.

Referring to FIGS. 7, 10 and 11, in a preferred embodiment, a collar 25 includes a plurality of electrically mated modular regions 26, similar to the above described leash 20, and having the same lengthening and illuminating capabilities for use with differently sized animals. Each of such modular regions 26 includes a plurality of illuminable light-emitting sources 22 housed therein and advantageously connected in sequence respectively, which is critical such that selected ones of the modular region light-emitting sources 22 illuminate in sync with respect to other ones of the modular region light-emitting sources 22. Each of the modular segments 21 and the modular regions 26 includes detachably mated conductive male 27 and female 28 couplings advantageously disposed at opposed ends thereof respectively. Such couplings 27, 28 allow a user to easily mate modular segments 21 and modular regions 26 as desired.

Figure 8:
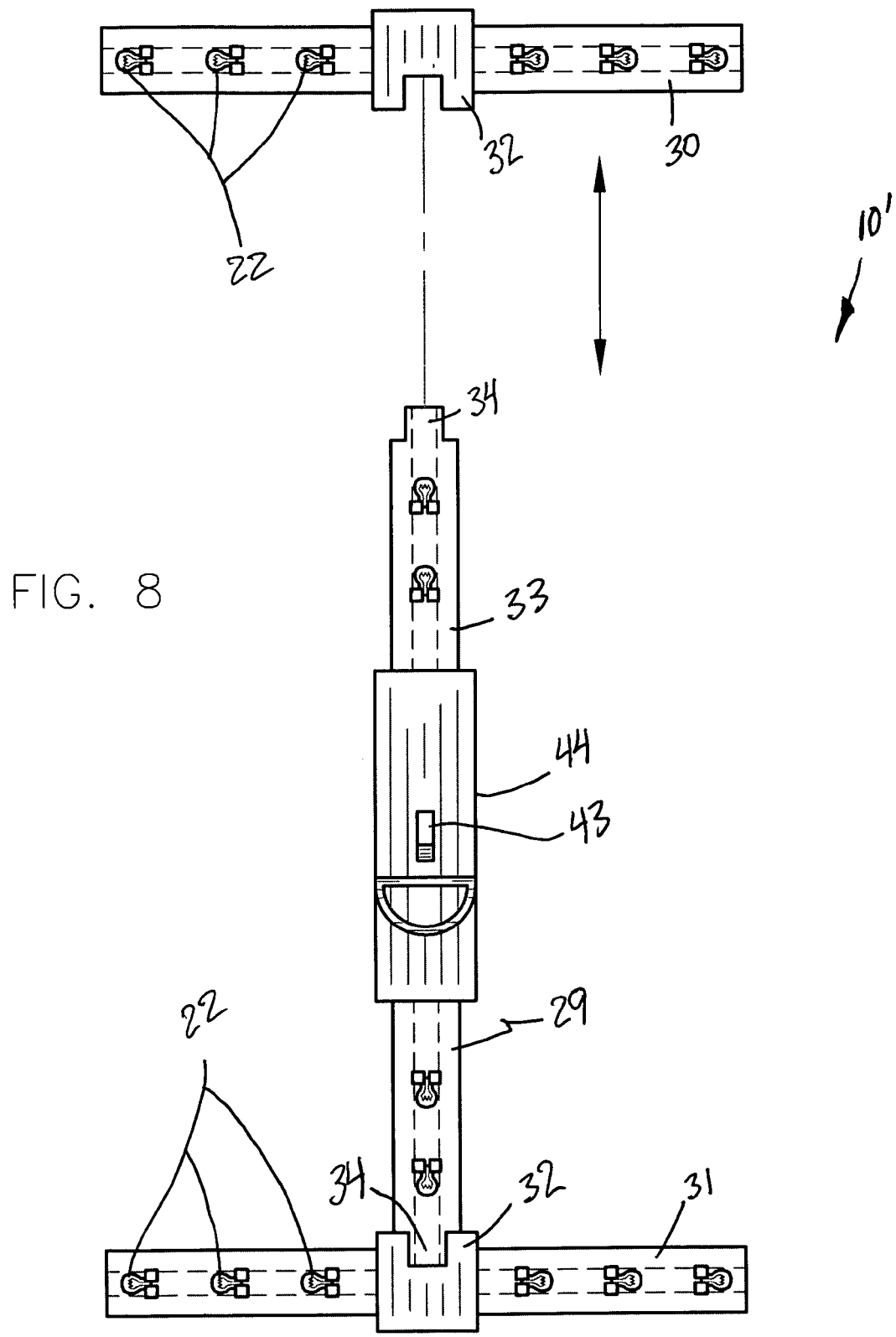
FIG. 8 is a top plan view of the collar, in an alternate embodiment, showing a first modular region disconnected from a third modular region.
Figure 9:
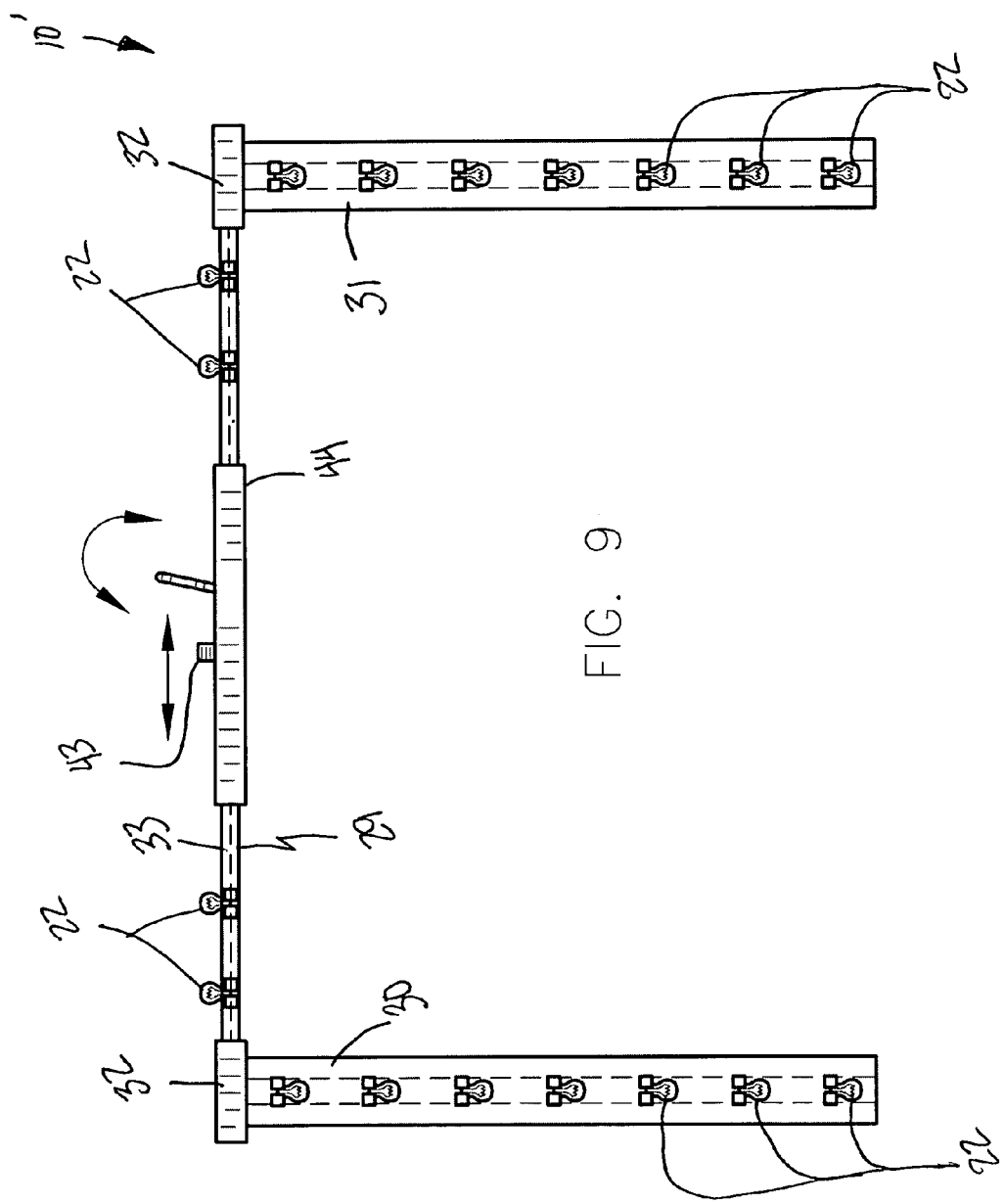
FIG. 9 is a side elevational view of the collar shown in FIG. 8 showing the first, second and third modular regions in a connected position.
Figure 12:
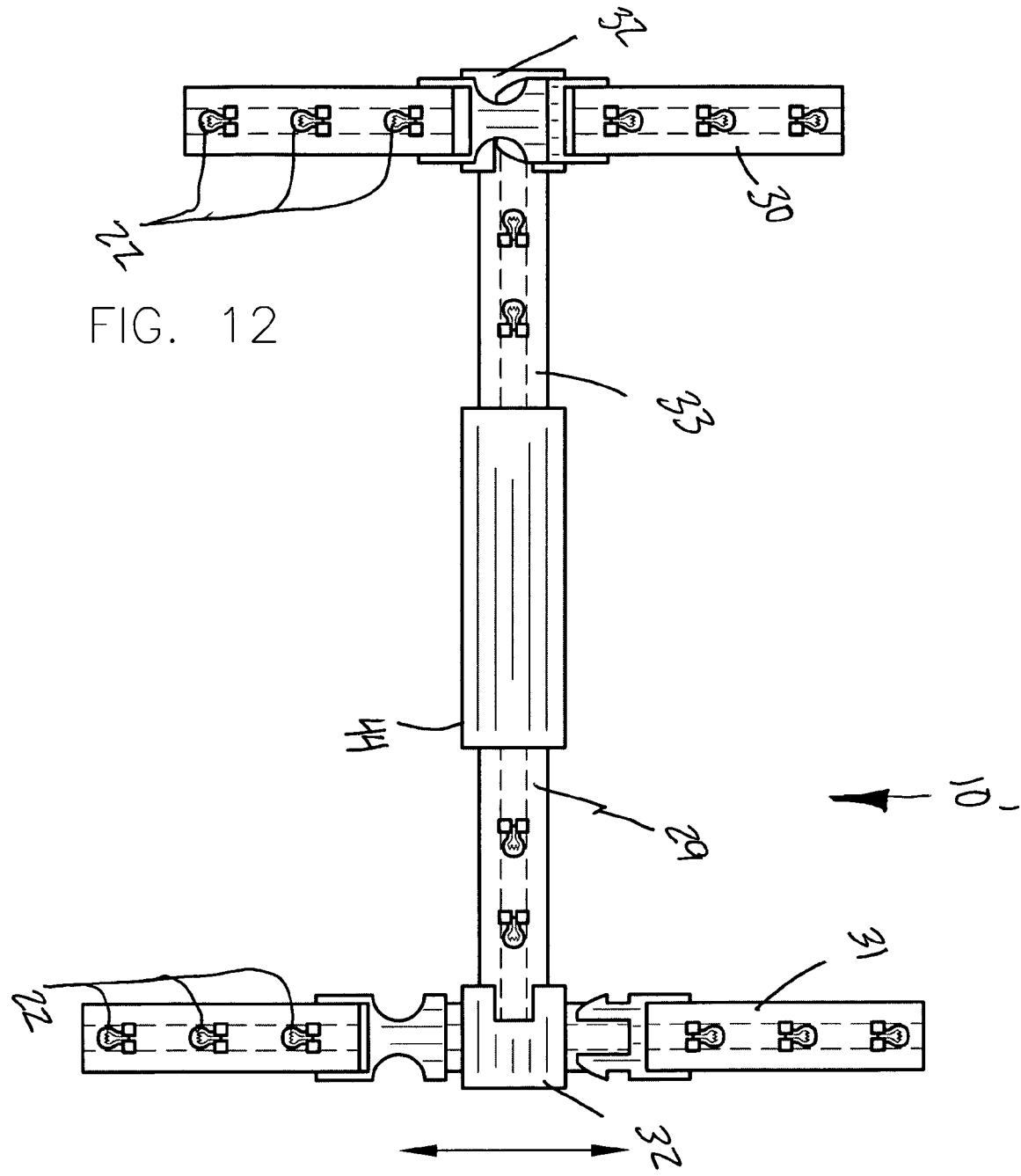
FIG. 12 is a bottom plan view of the collar shown in FIG. 9.

Referring to FIGS. 8, 9 and 12, in an alternate embodiment, the assembly 10' includes a collar 29 that includes first 30 and second 31 modular regions that have annular shapes provided with electrically mated conductive terminals 32. A third one 33 of the modular regions has a rectilinear shape provided with axially opposed conductive terminals 34 removably coupled directly to the first and second modular regions 30, 31, without the use of intervening elements. Such first, second and third modular regions 30, 31, 33 have the same lengthening and illuminating capabilities as the leash 20 and collar 25 described above.

Figure 2:
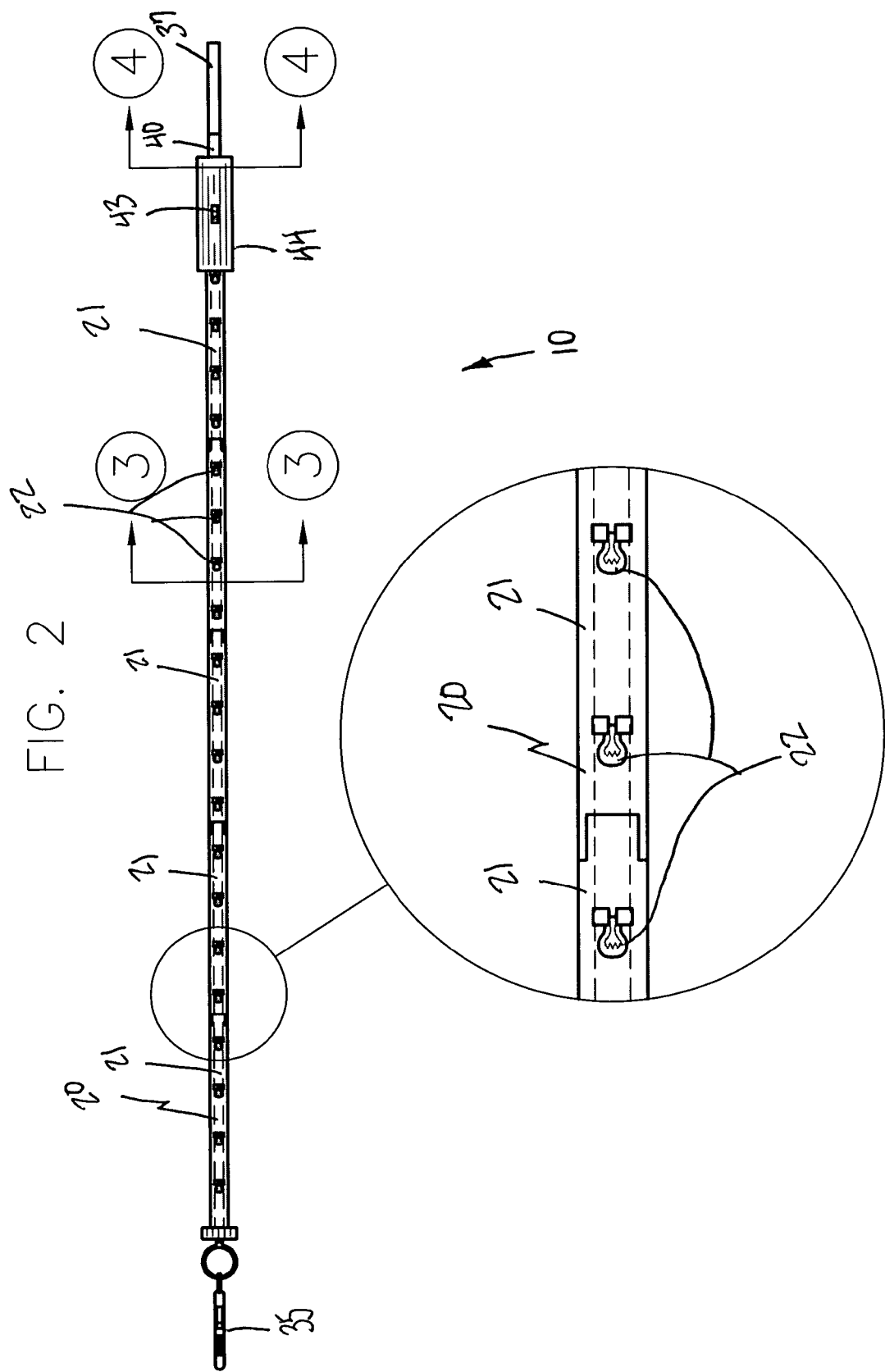
FIG. 2: is a top elevational and partial expanded view of the assembly shown in FIG. 1.
Figure 3:
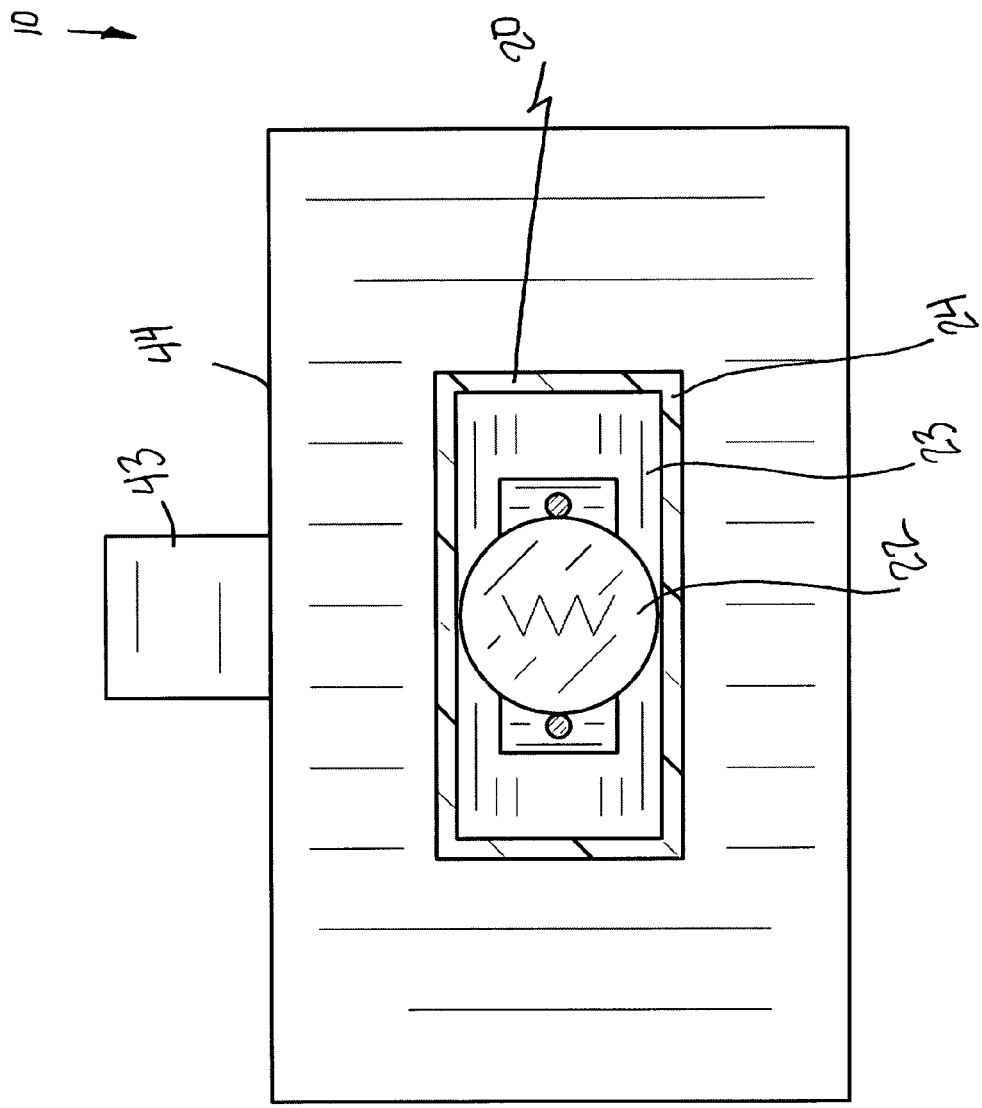
FIG. 3 is a cross sectional view of the assembly shown in FIG. 2, taken along line 3-3.
Figure 4:
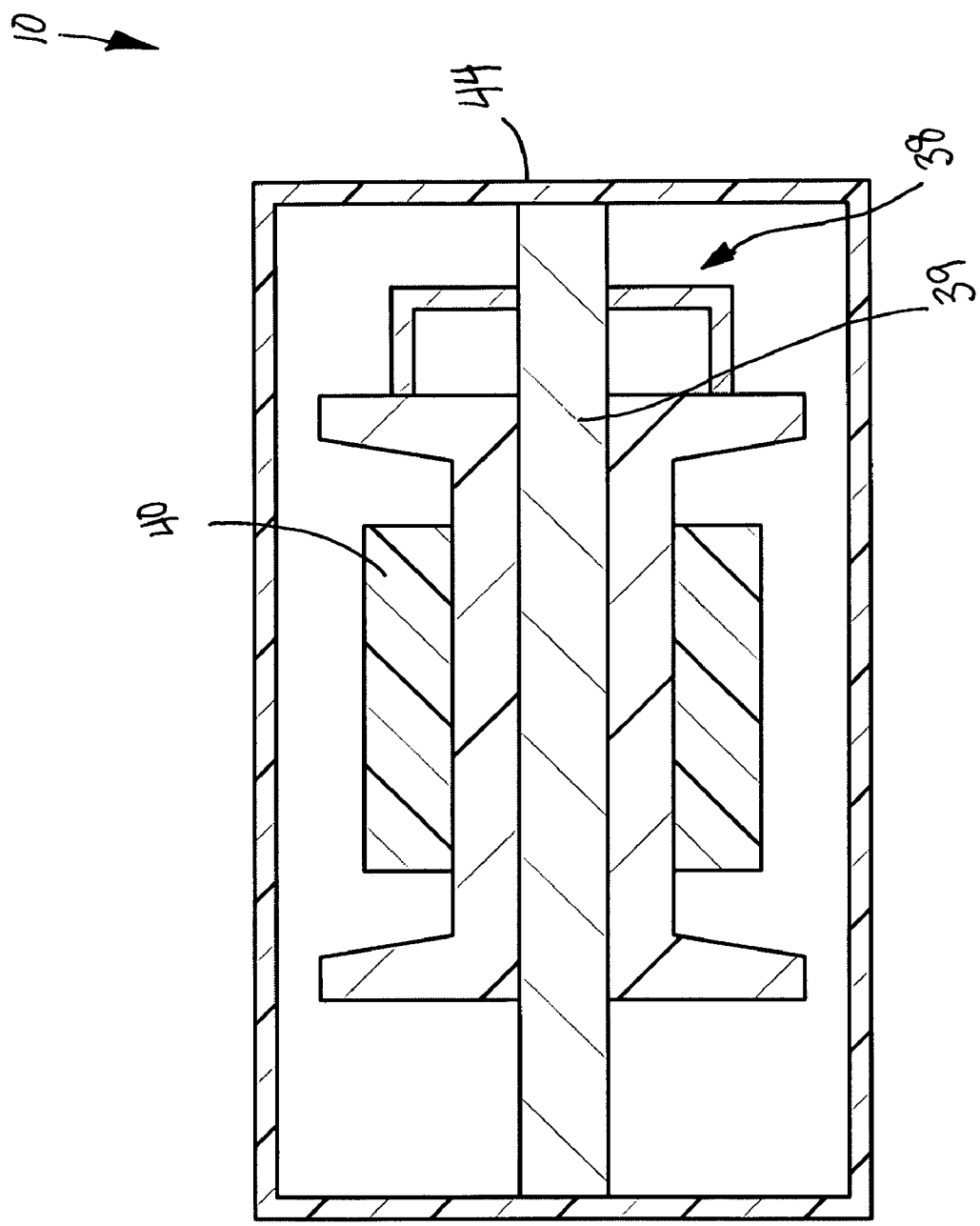
FIG. 4 is a cross sectional view of the assembly shown in FIG. 2, taken along line 4-4.
Figure 6:
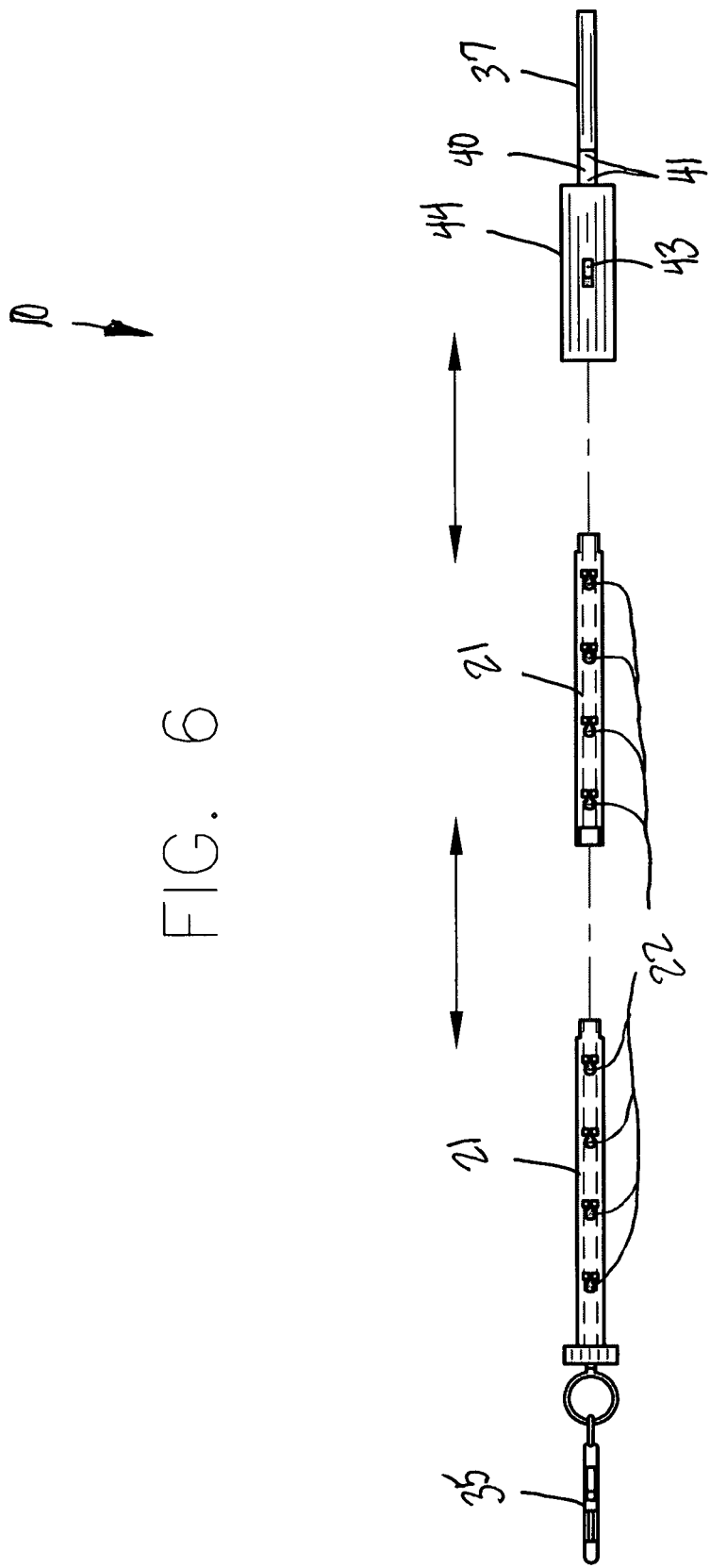
FIG. 6 is a top elevational view of the assembly shown in FIG. 2 showing the modular segments and handle respectively, in an unmated position.

Referring to FIGS. 1, 2 and 6, the leash 20 further includes a fastener 35 connected directly to one end portion thereof, without the use of intervening elements. Such a fastener 35 is in electrical communication with an internal power source 62 (herein described below) and is advantageously provided with a conductive terminal removably engaged with the conductive terminals 32, 34 of the first, second and third modular regions 30, 31, 33, which is crucial to thereby maintain direct electrical communication with the first, second and third modular regions 30, 31, 33, without the use of intervening elements, when the leash 20 is attached to the harness 29. Such a fastener 35 allows the user to electrically connect the leash 20 to the harness 29, and thereby illuminate the harness 29 while holding the leash 20.

Yet again referring to FIGS. 1 through 6, the assembly 10 further includes an extendable handle 37 removably attached to the leash 20 and spaced from the collar 25. Such a handle 37 is selectively adaptable between alternate longitudinal lengths when pulled along a predetermined path away from the leash 20. Such adaptability allows a user to illuminate the leash 20 while attached to a collar 25 when an animal increases the distance between the animal and the user, thereby increasing the visibility of the animal and the user as the distance increases.

The light-emitting sources 22 housed within the leash 20 remain non-illuminated while the light-emitting sources 22 housed within the collar 25 are illuminated when the handle 37 is adapted to a first spatial distance 60 away from the leash 20. Such a first spatial distance 60 is defined as a longitudinal length less than one-half of the longitudinal length of the leash 20. The light-emitting sources 22 housed within the leash 20 remain illuminated while the light-emitting sources 22 housed within the collar 25 are illuminated when the handle 37 is adapted to a second spatial distance 61. Such a second spatial distance 61 is defined as a longitudinal length greater than one-half of the longitudinal length of the leash 20. Thus, as the pet is separated from the caregiver, both the leash 20 and the collar 25 will illuminate until the pet comes closer to the caregiver.

Figure 5:
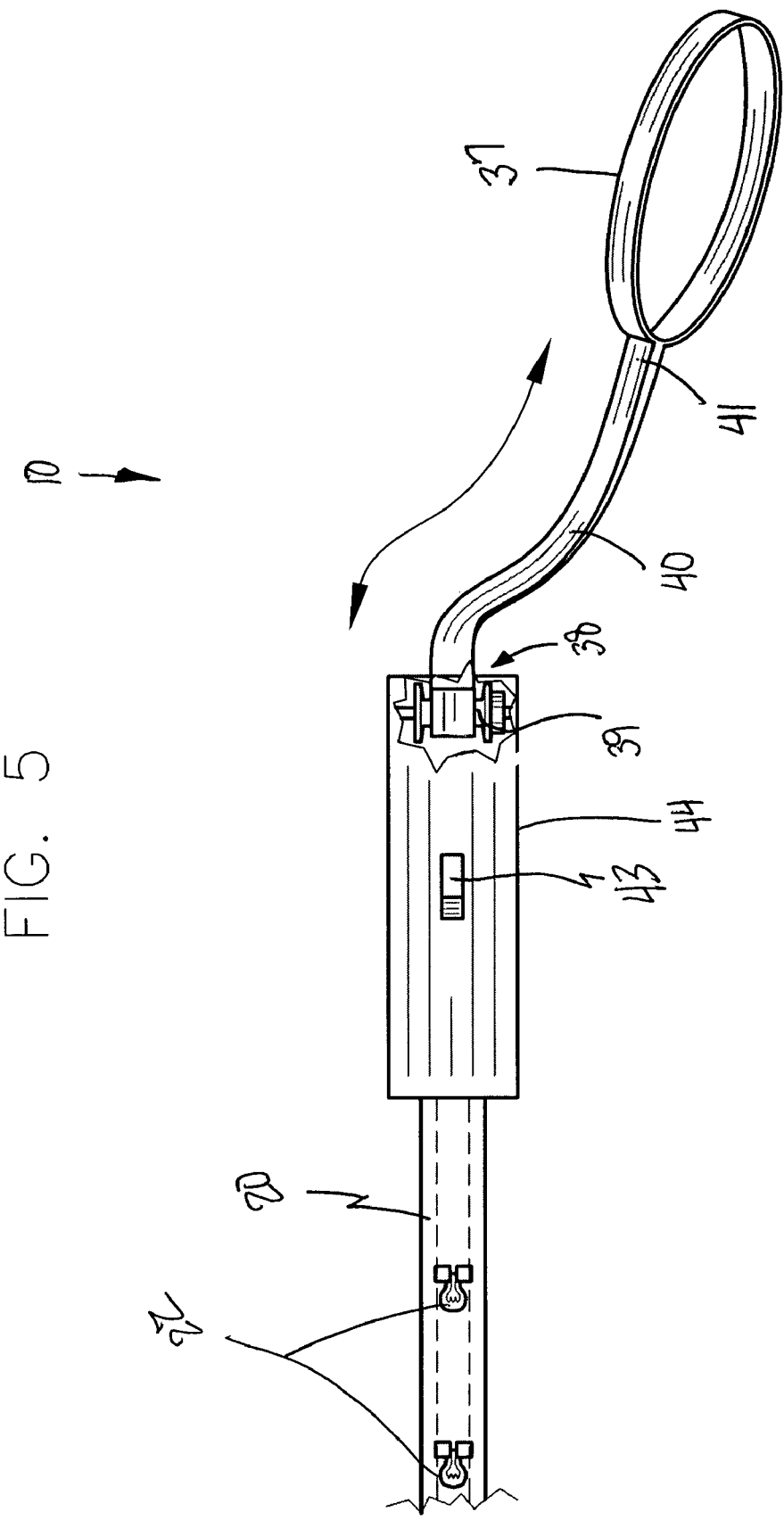
FIG. 5 is a cut-away view of the spring-actuated spindle located within the handle.
Figure 13:
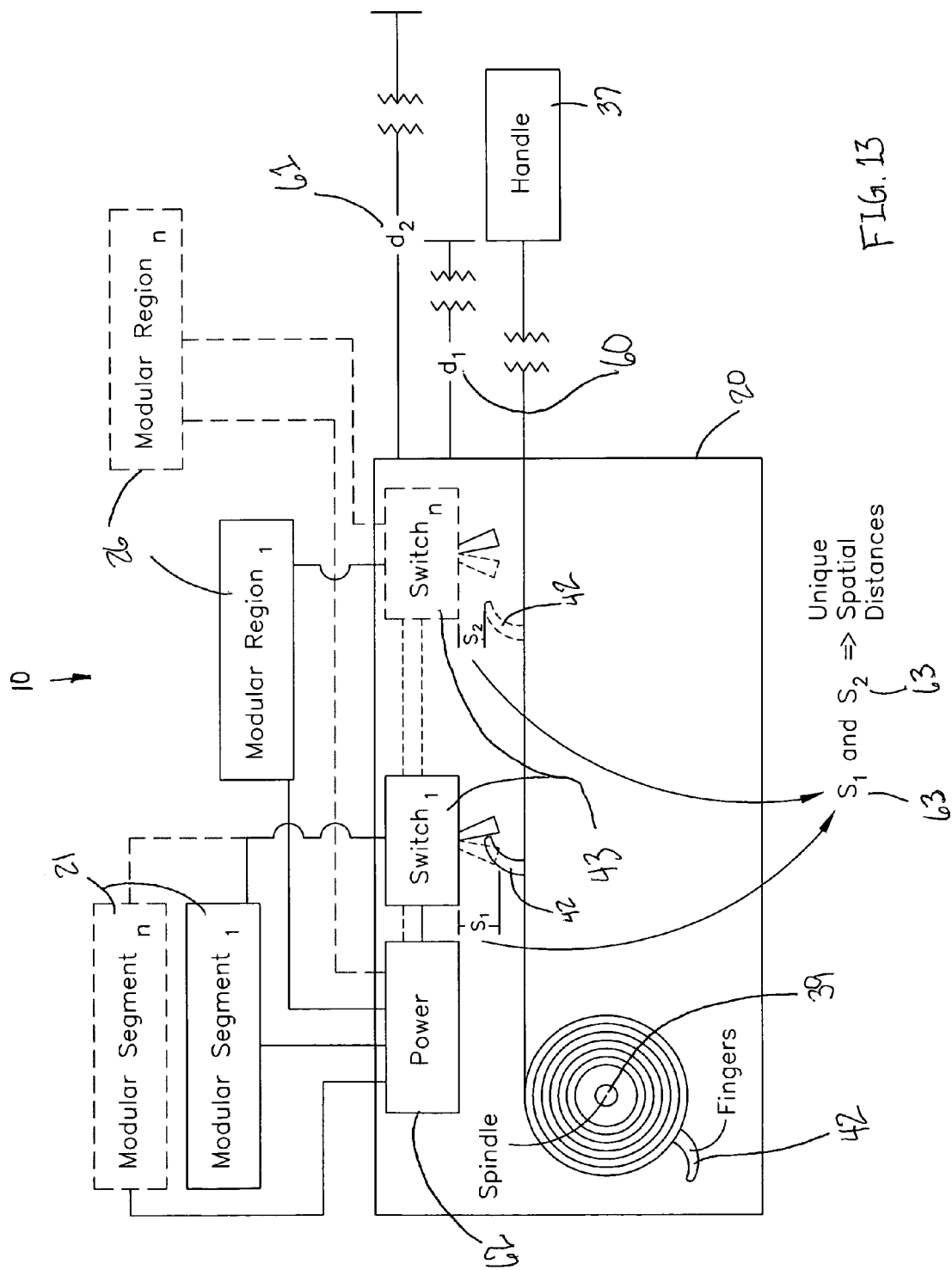
FIG. 13 is a schematic block diagram of the illuminating mechanism in accordance with the present invention.

Referring to FIGS. 5 and 13, the assembly 10 further includes a mechanism 38 for independently illuminating the selected modular segment 21 and modular region 26 light-emitting sources 22 respectively, which is vital such that the modular segment 21 and modular region 26 light-emitting sources 22 remain non-illuminated based upon the longitudinal length of the handle 37 with respect to a longitudinal length of the leash 20. Such an independent illuminating mechanism 38 includes a spring-actuated spindle 39 and a flexible cable 40 journaled thereabout. Such a cable 40 has opposed ends 41 directly anchored to the handle 37 and the spindle 39 respectively, without the use of intervening elements, and conveniently includes a plurality of actuating fingers 42 protruding outwardly therefrom. Each of the fingers 42 is uniquely sized and maintains a unique spatial distance 63 (defined as S1 and S2 in FIG. 13) from the associated switch 43 (herein described below), which is important such that associated ones of the fingers 42 advantageously engage associated ones of the switches 43 while traveling along a single travel path and thereby prohibit non-corresponding ones of the fingers 42 and switches 43 from engaging as the cable 40 is extracted and retracted from the compartment 44 (herein described below).

Referring to FIGS. 1, 2, 3, 4, 5, 6, 7, 8, 9, 12 and 13, the independent illuminating mechanism 38 further includes a plurality of switches 43 housed within a compartment 44 defined within the leash 20, and electrically coupled to an internal power supply source 62 respectively. Such switches 43 are contiguously laid along a travel path of the cable 40, which is necessary such that the fingers 42 sequentially toggle associated ones of the switches 43 while the cable 40 is passed through the compartment 44 to thereby toggle the switches 43 between open and closed positions respectively.

As the cable 40 is passed through the compartment 44 while the user selectively lengthens the leash 20, the switches 43 are toggled between open and closed positions, and thereby illuminate the light-emitting sources 22. Each of the switches 43 is electrically coupled to corresponding ones of the modular segments 21 and modular regions 26 respectively, which is essential such that the light-emitting sources 22 associated with the corresponding modular segments 21 and modular regions 26 are independently illuminated when the fingers 42 toggle the associated ones of the switches 43 respectively.

The modular segments 21 and modular regions 26 of the present invention provide the unexpected benefit of allowing a user to selectively lengthen or shorten the leash 20 as desired. In addition, the illuminating mechanism 38 provides the unexpected benefit of allowing a user to selectively illuminate all or individual portions of the assembly 10 and 10' through the use of the handle 37 based on lighting conditions and user desire. The above mentioned benefits of the assembly 10 and 10' overcome the shortcomings of the prior art.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. An illuminable animal leash and collar assembly for allowing a caregiver and bystanders to easily identify an animal during low ambient light conditions, said illuminable animal leash and collar assembly comprising:

a leash including a plurality of electrically mated modular segments connected end-to-end and thereby defining a rectilinear longitudinal shape, each of said modular segments including a plurality of illuminable light-emitting sources housed therein and connected in sequence respectively such that selected ones of said modular segment light-emitting sources illuminate in sync with respect to other ones of said modular segment light-emitting sources;

a collar including a plurality of electrically mated modular regions, each of said modular regions including a plurality of illuminable light-emitting sources housed therein and connected in sequence respectively such that selected ones of said modular region light-emitting sources illuminate in sync with respect to other ones of said modular region light-emitting sources;

an extendable handle removably attached to said leash and spaced from said collar, said extendable handle being selectively adaptable between alternate longitudinal lengths when pulled along a predetermined path away from said leash; and means for independently illuminating said selected modular segment and region light-emitting sources respectively such that said modular segment and region light-emitting sources remain non-illuminated based upon the longitudinal length of said handle with respect to a longitudinal length of said leash.

2. The leash and collar assembly of claim 1, wherein said light-emitting sources housed within said leash remain non-illuminated while said light-emitting sources housed within said collar are illuminated when said handle is adapted to a first spatial distance away from said leash, said first spatial distance being defined as a longitudinal length less than one-half of the longitudinal length of said leash.

3. The leash and collar assembly of claim 1, wherein said light-emitting sources housed within said leash remain illuminated while said light-emitting sources housed within said collar are illuminated when said handle is adapted to a second spatial distance, said second spatial distance being defined as a longitudinal length greater than one-half of the longitudinal length of said leash.

4. The leash and collar assembly of claim 1, wherein each of said modular segments and said modular regions comprises:

detachably mated conductive male and female couplings disposed at opposed ends thereof respectively.

5. The leash and collar assembly of claim 1, wherein said independent illuminating means further comprises:

a spring-actuated spindle and a flexible cable journaled thereabout, said cable having opposed ends directly anchored to said handle and said spindle respectively, said cable including a plurality of actuating fingers protruding outwardly therefrom; and a plurality of switches housed with a compartment defined within said leash, said switches being electrically coupled to an internal power supply source respectively, said switches being contiguously laid along a travel path of said cable in such a manner that said fingers sequentially toggle associated ones of said switches while said cable is passed through said compartment to thereby toggle said switches between open and closed positions respectively, each of said switches being electrically coupled to corresponding ones of said modular segments and regions respectively such that said light-emitting sources associated with said corresponding modular segments and regions are independently illuminated when said fingers toggle said associated ones of said switches respectively;

wherein each of said fingers is uniquely sized and maintains a unique spatial distance from said associated switch such that associated ones of said fingers engage associated ones of said switches while traveling along a single travel path and thereby prohibit non-corresponding ones of said fingers and switches from engaging as said cable is extracted and retracted from said compartment.

6. The leash and collar assembly of claim 1, wherein said modular regions of said collar comprise:

first and second modular regions having annular shapes provided with electrically mated conductive terminals; and a third one of said modular regions having a rectilinear shape provided with axially opposed conductive terminals removably coupled directly to said first and second modular regions;

wherein said leash further comprises a fastener connected directly to one end portion thereof, said fastener being in electrical communication with an internal power source and being provided with a conductive terminal removably engaged with said conductive terminals of said first, second and third regions to thereby maintain direct electrical communication with said first, second and third modular regions when said leash is attached to said collar.

7. An illuminable animal leash and collar assembly for allowing a caregiver and bystanders to easily identify an animal during low ambient light conditions, said illuminable animal leash and collar assembly comprising:

a leash including a plurality of electrically mated modular segments connected end-to-end and thereby defining a rectilinear longitudinal shape, wherein said modular segments are interchangeably coupled along a longitudinal length of said leash, each of said modular segments including a plurality of illuminable light-emitting sources housed therein and connected in sequence respectively such that selected ones of said modular segment light-emitting sources illuminate in sync with respect to other ones of said modular segment light-emitting sources;

a collar including a plurality of electrically mated modular regions, each of said modular regions including a plurality of illuminable light-emitting sources housed therein and connected in sequence respectively such that selected ones of said modular region light-emitting sources illuminate in sync with respect to other ones of said modular region light-emitting sources;

an extendable handle removably attached to said leash and spaced from said collar, said extendable handle being selectively adaptable between alternate longitudinal lengths when pulled along a predetermined path away from said leash; and means for independently illuminating said selected modular segment and region light-emitting sources respectively such that said modular segment and region light-emitting sources remain non-illuminated based upon the longitudinal length of said handle with respect to a longitudinal length of said leash.

8. The leash and collar assembly of claim 7, wherein said light-emitting sources housed within said leash remain non-illuminated while said light-emitting sources housed within said collar are illuminated when said handle is adapted to a first spatial distance away from said leash, said first spatial distance being defined as a longitudinal length less than one-half of the longitudinal length of said leash.

9. The leash and collar assembly of claim 7, wherein said light-emitting sources housed within said leash remain illuminated while said light-emitting sources housed within said collar are illuminated when said handle is adapted to a second spatial distance, said second spatial distance being defined as a longitudinal length greater than one-half of the longitudinal length of said leash.

10. The leash and collar assembly of claim 7, wherein each of said modular segments and said modular regions comprises:
   detachably mated conductive male and female couplings disposed at opposed ends thereof respectively.

11. The leash and collar assembly of claim 7, wherein said independent illuminating means further comprises:
   a spring-actuated spindle and a flexible cable journaled thereabout, said cable having opposed ends directly anchored to said handle and said spindle respectively, said cable including a plurality of actuating fingers protruding outwardly therefrom; and
   a plurality of switches housed with a compartment defined within said leash, said switches being electrically coupled to an internal power supply source respectively, said switches being contiguously laid along a travel path of said cable in such a manner that said fingers sequentially toggle associated ones of said switches while said cable is passed through said compartment to thereby toggle said switches between open and closed positions respectively, each of said switches being electrically coupled to corresponding ones of said modular segments and regions respectively such that said light-emitting sources associated with said corresponding modular segments and regions are independently illuminated when said fingers toggle said associated ones of said switches respectively;
   wherein each of said fingers is uniquely sized and maintains a unique spatial distance from said associated switch such that associated ones of said fingers engage associated ones of said switches while traveling along a single travel path and thereby prohibit non-corresponding ones of said fingers and switches from engaging as said cable is extracted and retracted from said compartment.

12. The leash and collar assembly of claim 7, wherein said modular regions of said collar comprise:
   first and second modular regions having annular shapes provided with electrically mated conductive terminals; and
   a third one of said modular regions having a rectilinear shape provided with axially opposed conductive terminals removably coupled directly to said first and second modular regions;
   wherein said leash further comprises
      a fastener connected directly to one end portion thereof, said fastener being in electrical communication with an internal power source and being provided with a conductive terminal removably engaged with said conductive terminals of said first, second and third regions to thereby maintain direct electrical communication with said first, second and third modular regions when said leash is attached to said collar.

13. An illuminable animal leash and collar assembly for allowing a caregiver and bystanders to easily identify an animal during low ambient light conditions, said illuminable animal leash and collar assembly comprising:
   a leash including a plurality of electrically mated modular segments connected end-to-end and thereby defining a rectilinear longitudinal shape, wherein said modular segments are interchangeably coupled along a longitudinal length of said leash, each of said modular segments including a plurality of illuminable light-emitting sources housed therein and connected in sequence respectively such that selected ones of said modular segment light-emitting sources illuminate in sync with respect to other ones of said modular segment light-emitting sources, wherein each of said modular segments comprises
      a tubular core embedded with corresponding ones of said light-emitting sources; and
      a transparent hollow sleeve removably positioned about said tubular core, said sleeve having a unitary and continuous body extending along the entire longitudinal length of said modular segment associated therewith;
   a collar including a plurality of electrically mated modular regions, each of said modular regions including a plurality of illuminable light-emitting sources housed therein and connected in sequence respectively such that selected ones of said modular region light-emitting sources illuminate in sync with respect to other ones of said modular region light-emitting sources;
   an extendable handle removably attached to said leash and spaced from said collar, said extendable handle being selectively adaptable between alternate longitudinal lengths when pulled along a predetermined path away from said leash; and
   means for independently illuminating said selected modular segment and region light-emitting sources respectively such that said modular segment and region light-emitting sources remain non-illuminated based upon the longitudinal length of said handle with respect to a longitudinal length of said leash.

14. The leash and collar assembly of claim 13, wherein said light-emitting sources housed within said leash remain non-illuminated while said light-emitting sources housed within said collar are illuminated when said handle is adapted to a first spatial distance away from said leash, said first spatial distance being defined as a longitudinal length less than one-half of the longitudinal length of said leash.

15. The leash and collar assembly of claim 13, wherein said light-emitting sources housed within said leash remain illuminated while said light-emitting sources housed within said collar are illuminated when said handle is adapted to a second spatial distance, said second spatial distance being defined as a longitudinal length greater than one-half of the longitudinal length of said leash.

16. The leash and collar assembly of claim 13, wherein each of said modular segments and said modular regions comprises:
  detachably mated conductive male and female couplings disposed at opposed ends thereof respectively.

17. The leash and collar assembly of claim 13, wherein said independent illuminating means further comprises:
  a spring-actuated spindle and a flexible cable journaled thereabout, said cable having opposed ends directly anchored to said handle and said spindle respectively, said cable including a plurality of actuating fingers protruding outwardly therefrom; and
  a plurality of switches housed with a compartment defined within said leash, said switches being electrically coupled to an internal power supply source respectively, said switches being contiguously laid along a travel path of said cable in such a manner that said fingers sequentially toggle associated ones of said switches while said cable is passed through said compartment to thereby toggle said switches between open and closed positions respectively, each of said switches being electrically coupled to corresponding ones of said modular segments and regions respectively such that said light-emitting sources associated with said corresponding modular segments and regions are independently illuminated when said fingers toggle said associated ones of said switches respectively;
  wherein each of said fingers is uniquely sized and maintains a unique spatial distance from said associated switch such that associated ones of said fingers engage associated ones of said switches while traveling along a single travel path and thereby prohibit non-corresponding ones of said fingers and switches from engaging as said cable is extracted and retracted from said compartment.

18. The leash and collar assembly of claim 13, wherein said modular regions of said collar comprise:
  first and second modular regions having annular shapes provided with electrically mated conductive terminals; and
  a third one of said modular regions having a rectilinear shape provided with axially opposed conductive terminals removably coupled directly to said first and second modular regions;
  wherein said leash further comprises
    a fastener connected directly to one end portion thereof, said fastener being in electrical communication with an internal power source and being provided with a conductive terminal removably engaged with said conductive terminals of said first, second and third regions to thereby maintain direct electrical communication with said first, second and third modular regions when said leash is attached to said collar.

* * * * *